Nov. 5, 1940.     B. C. PLACE     2,220,273
FASTENER
Filed Aug. 11, 1937     2 Sheets-Sheet 1
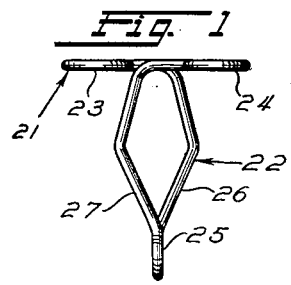
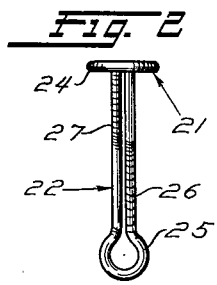
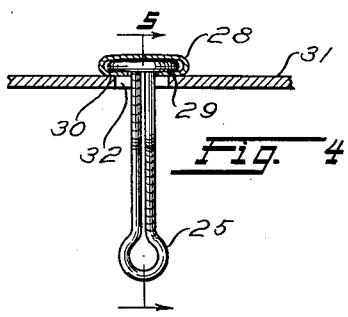
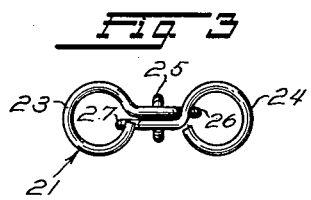
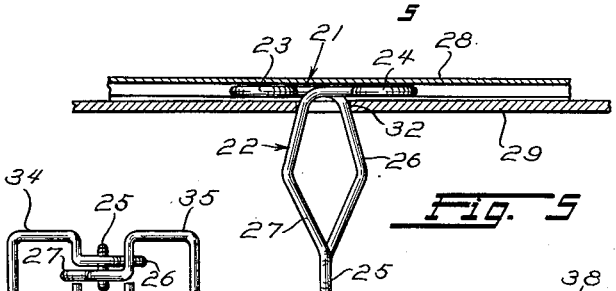
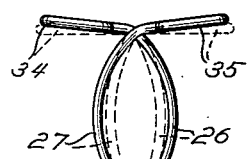
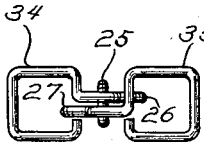
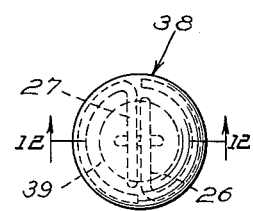
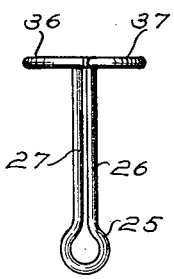
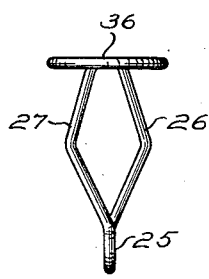
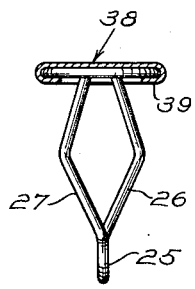
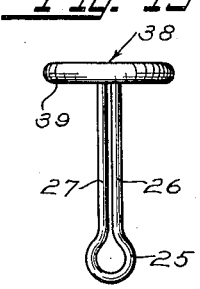
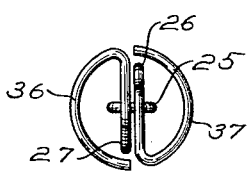
Inventor
Bion C. Place
By Strauch & Hoffman
Attorneys

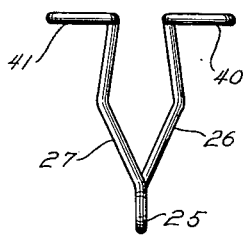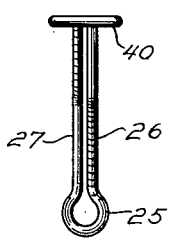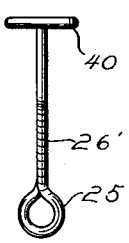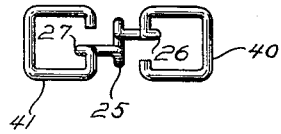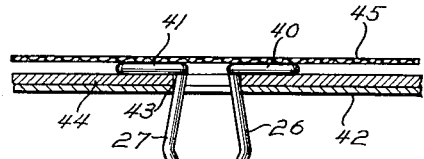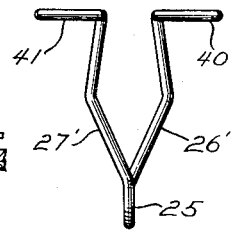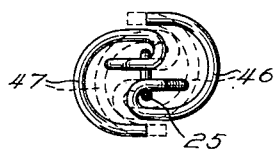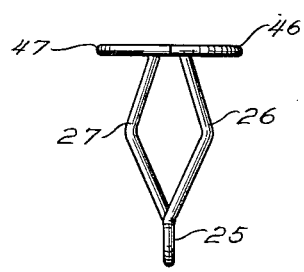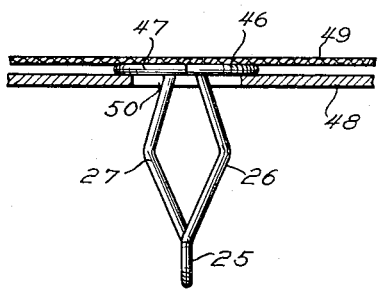

Patented Nov. 5, 1940

2,220,273

UNITED STATES PATENT OFFICE 2,220,273

FASTENER

Bion C. Place, Detroit, Mich., assignor of one-half to George E. Gagnier, Detroit, Mich.

Application August 11, 1937, Serial No. 158,570

9 Claims. (Cl. 24—215)

The present invention relates to spring stud fasteners constructed from a single piece of wire. More particularly, the invention relates to a wire spring stud fastener of the type in which the shank or entering part of the fastener is formed from the mid-portion of the piece of wire.

Wire spring stud fasteners as heretofore made are of two distinct types. In one type of such a fastener, the entering part or shank is constructed from the ends of a single piece of wire, the head being formed from the mid-portion. In the other type, the shank or entering part is formed from the mid-portion of the wire and the head from the end. Wire spring stud fasteners constructed so that the entering part is formed from the mid-portion of the piece of wire to which type of fastener the present invention is particularly concerned, have a number of advantages over the other type of spring stud fastener in which the shank or entering part is constructed from the ends of the wire. The principal advantage of wire spring stud fasteners having the entering part formed from the mid-portion of the wire is that the point of flexure of the legs of the shank takes place at a point substantially spaced from the point of contact of each leg with the inner corner of the opening in the supporting structure, permitting a greater range of movement of said point of contact, and a longer leverage for the action of the legs in firmly maintaining the material secured by the fastener against the support.

Another advantage of a spring stud fastener having the shank constructed from the mid-position of a piece of wire is that the ends can be concealed or better protected by forming the head so that said ends are unexposed. Because of the advantages just referred to, wire spring stud fasteners constructed so that the mid-portion of the wire forms the entering part of the fastener are preferred for many purposes.

A primary purpose of the present invention is to improve the construction of wire spring stud fasteners of the type in which the entering part of the fastener is formed from the mid-portion of a single piece of wire by shaping the shank of such a fastener so that a portion of the wire from which the shank is constructed is put under torsion when the legs are moved whereby the shank of the fastener is stiffened over a fastener constructed from the same gauge wire in the manner heretofore known and whereby the shank of the fastener can be very substantially contracted without causing the wire to assume a distorted shape.

Another object of the present invention is to provide an improved spring stud fastener having a shank constructed from the mid-portion of a piece of wire, which shank includes two outwardly bowed legs that are connected together at the entering point of the shank by a loop-like portion, the plane of said loop-like portion being disposed at right angles to the plane of either of said outwardly bowed legs.

Still another object of the invention is to provide a one-piece wire spring stud fastener consisting of a head comprising two loops disposed substantially in the same plane and a shank consisting of a third loop disposed in a plane at right angles to said first named plane and a pair of outwardly bowed legs which serve to connect the loop of the shank with each of the loops of the head.

Still another object of the invention is to provide a spring stud fastener including a shank consisting of two legs connected at the entering point thereof in such a way that the legs of the shank can pass each other adjacent the head in scissors-like fashion and in which the head is so constructed as to permit it to be substantially contracted when the legs pass each other as just stated.

A still further object of the invention is to provide a spring stud fastener constructed of wire and in which the legs of the shank are connected together at the entering point thereof by means of a loop disposed in a plane transverse to the plane of said legs and in which the legs are arranged so as to cross each other adjacent the head of the fastener, whereby the fastener may be formed from the wire without making sharp bends therein.

Still another object of the invention is to provide an improved wire spring stud fastener possessing unusual strength and resistance to becoming set in use, though the fastener be constructed of wire having a wire of relatively small diameter.

Still further objects of the invention will appear as the description thereof proceeds with reference to the accompanying drawings in which:

Figures 1, 2 and 3 are respectively side, edge and top plan views of a fastener including the present invention and designed particularly for securing hollow moldings or finishing strips to sheet metal or similar supporting structures.

Figures 4 and 5 are sectional views, Figure 5 being taken on the plane indicated by the line 5—5 on Figure 4 of the fastener of Figures 1, 2 and 3 as applied in securing a hollow molding or finishing strip to a supporting structure.

Figures 6 and 7 are respectively side and plan views of a modified form of the fastener illustrated in Figures 1, 2 and 3.

Figures 8, 9 and 10 are respectively edge, side and top plan views of a modified form of fastener including the present invention in which the head is of a circular disc-like shape.

Figures 11, 12 and 13 are respectively edge, sectional and top plan views of a modification of the fastener illustrated in Figures 8, 9 and 10, the sectional view of Figure 12 being taken on the plane indicated by the line 12—12 in Figure 13.

Figures 14, 15 and 16 are respectively side, edge, and top plan views of a further modification of the form of fastener illustrated in Figures 1, 2 and 3.

Figures 14a and 15a are respectively, side and edge views of a modified form of the fastener illustrated in Figures 14 and 15.

Figure 17 is a fragmentary sectional view indicating one way in which the fastener illustrated in Figures 14, 15 and 16, 14a and 15a may be used.

Figures 18 and 19 are respectively top, plan and side views of a further modified form of fastener constructed so that the dimensions of the head thereof may be very substantially reduced upon contraction of the shank of the fastener whereby the head may be passed through an aperture in a panel or similar structure of a size substantially smaller than the normal maximum dimension of said head.

Figure 20 is a fragmentary sectional view showing the fastener of Figures 18 and 19 applied to a covered trim panel by contraction of its head and passing through an opening therein and subsequent expansion between the cover and foundation of the panel.

Like reference characters indicate like parts throughout the several figures.

The fastener of Figures 1, 2 and 3 comprises a head 21 and a shank 22. The head 21 comprises two loops 23 and 24 formed from the ends of a single piece of wire from which the fastener is constructed. The shank 22 comprises a loop 25 at the entering point of the shank and a pair of outwardly bowed legs 26 and 27. The plane of the loop 25 is at right angles to the planes of the outwardly bowed legs 26 and 27 as illustrated. The loop 23 is carried by the leg 26 while the loop 24 is carried by the leg 27, it being necessary to cross the legs in or adjacent the plane of the head in order to so construct the fastener.

The fastener just described is peculiarly well adapted for the securing of hollow moldings upon a sheet metal or like structure in the manner illustrated in Figures 4 and 5 of the drawings. Referring to these figures a hollow molding 28 having inturned flanges 29 and 30 is shown secured to a structure 31 having an opening 32 for the reception of the shank of the fastener. The fastener of Figures 1, 2 and 3 is first inserted in the hollow molding from one of the ends thereof, loops 23 and 24 being constructed of such width that they fit snugly between the opposite walls of the molding. The fastener is shifted to proper position endwise of the molding and the number of fasteners necessary to attach the molding applied thereto, the shank of the fasteners protruding between the flanges 29 and 30 as will be understood. After the fasteners have been assembled with respect to the molding the molding is then applied to the structure 31 by entering the protruding shanks in the openings, such as the opening 32 therein. The opening 32 is made of a size sufficient to permit the free passage of the loop 25 and is of substantially less width than the maximum width of the shank of the fastener measured across the point of maximum outward bowing of the legs 26 and 27. The shanks of the fastener is then forced into the opening 32, the width thereof measured across the point of maximum outward bowing of the legs being substantially diminished by bending the legs towards each other caused by engagement of the diverging guiding surfaces of the lower part of the legs with the corner of the opening 32 as the shank of the fastener is forced therethrough. The movement of the legs 26 and 27 places the wire forming the loop 25 at the end of the shank under torsion, and when the point of maximum bowing has passed through the opening 32 the legs again spring apart causing the holding surfaces, which diverge from the head, to engage the inner corner of the opening as illustrated in Figure 5 of the drawings. The movement of the legs is attended by some shifting of the loops 23 and 24 in the molding. The torsion set up in the loops 25 serves to spread the head sections of the loops 23 and 24 apart when the fastener is in holding position.

Inasmuch as wire is capable of withstanding substantial torsional stress without causing a set in the wire, the shank of the fastener has a high degree of resilience and the legs thereof can be substantially moved without causing any permanent set of change of form in the fastener. The fastener accordingly can be designed so that substantial movement of the outwardly bowed legs takes place setting up a substantial torsion in the loop 25, which is effective to create a tendency in the legs to spread in holding position, which serves to force the molding into firm contact with the structure 31, and maintain it in this position, the fastener being under permanent tension in holding position.

In the modification of the invention illustrated in Figures 6 and 7 the fastener includes a head consisting of two loops 34 and 35 which are square in outline, rather than circular as in the form of the invention before described. Furthermore, the loops 34 and 35 are disposed at an obtuse angle to the plane of the loop 25. Accordingly when the shank of the fastener is contracted by moving the legs 26 and 27 towards each other, as indicated in dotted lines in Figure 6, the loops 34 and 35 are brought into a plane normal to the plane of the shank 25, as likewise indicated in dotted lines in said figure.

The shank of the fastener of this form of the invention is like that first described and like reference characters are applied thereto.

In the use of the fastener of Figures 6 and 7, to secure moldings, such as molding 28 in Figure 4, pressure is applied to the sides of the outwardly bowed legs 26 and 27 to contract and they are moved towards each other bringing the loops 34 and 35 into a plane normal to the loop 25 and into alignment with each other. The fastener may then be freely slid into the hollow molding from either end and when the pressure against the sides of the legs 26 and 27 is released the fastener has a tendency to assume its normal or untensioned position in which the loops are disposed at an obtuse angle to the plane of the loop of the shank. In this position the loops extend between the top of the molding and the interned flanges and the fastener will thus remain in the position at which the pressure against the sides of the legs is released. By utilizing a fastener of this form reliance may be placed upon the shape of the fastener to maintain it in position endwise of the molding, once it has been shifted to its proper position. In other respects, the fastener of Figures 6 and 7 functions after the manner of that illustrated in Figures 1 to 5, inclusive.

Referring to the form of the invention illustrated in Figures 8, 9 and 10, a fastener is disclosed including a shank like that of Figures 1, 2 and 3, and like reference characters are applied to the parts thereof. The head of the fastener in this form of the invention is of disk-like form and comprises two semi-circular open loops 36 and 37 which together form a substantially complete circle. The leg 26 carries the loop 37 while the leg 27 carries the loop 36. It will be understood that the legs 26 and 27 cross each other at or adjacent the plane of the head as in the form of the invention first described.

The fastener of Figures 8, 9 and 10 is particularly useful in securing trim panels or the like, or in any situation in which a flat disk-like or round head is desired. In use the shank of the fastener functions in the same manner as above described with reference to the form of the invention illustrated in Figures 1, 2 and 3, movement of the legs 26 and 27 in entering the shank in the perforations in the sheet metallic structure serving to place the sides of the loop 25 under torsion, which is very effective in resisting substantial movement of the legs without causing the shank of the fastener to assume a set condition.

In the form of the invention illustrated in Figures 11, 12 and 13, a further modification is disclosed in which the fastener of Figures 8, 9 and 10, is provided with a sheet metal cap 38, the margins of which are crimped or spun around the loops 36 and 37 as indicated at 39. The sheet metal cap serves to conceal the loops 36 and 37 which in this construction constitute a frame for the head.

Preferably in this form of the invention the margins of the cap are spun around the loops 36 and 37 so as to maintain them from movement when pressure is applied to the legs 26 and 27 tending to move them towards each other, movement of said legs being thus prevented it will be understood that the shank of the fastener is much stiffer than in the fasteners first described, so that the sheet metal cap serves not only as an ornamental or finishing cap, but as a means to prevent movement of the legs in the plane of the head.

In the use of the fastener of Figures 11, 12 and 13, the shank of the fastener is entered into an aperture in the supporting structure by causing the bowing of the legs to be flattened, the shank of course lengthening when the flattening of the outwardly bowed legs occurs. When the legs 26 and 27 are flattened in forcing the shank of the fastener of this form of the invention in the aperture in the supporting structure, a torsion is set up in the loop 25 which as in the forms of the invention first described, is very effective in causing the legs to assume their original condition once the pressure against the legs tending to flatten and lengthen them is released, or partially released, which condition occurs when the fastener is in its final or holding position.

In the form of the invention illustrated in Figures 14, 15 and 16, the head of the fastener comprises loops 40 and 41 carried by outwardly bowed legs 26 and 27, the loops 40 and 41 being each disposed directly above the leg to which it is connected. This fastener differs from that illustrated in Figures 6 and 7 in that the legs 26 and 27 do not cross each other at or adjacent the plane of the head.

The fastener of Figures 14, 15 and 16 may be used in securing a trim panel to a support 42 having an opening 43 for the passage of the shank of the fastener, as illustrated in Figure 17. When so used, the head of the fastener is disposed between a foundation 44 and the usual fabric or upholstery material 45 covering one side thereof. In holding position the fastener of this form of the invention presents two hollow wedges, each of which is formed by one of the head sections and the portion of the leg that carries it. The shank of the fastener is under tension when the fastener is in holding position, thus setting up a torsional strain in the loop 25 at the end of the shank which is very effective in forcing said hollow wedges away from each other, thus pressing the foundation firmly against the supporting structure 42.

If desired, the fastener of Figures 14, 15 and 16 may be constructed as illustrated in Figures 14A and 15A in which the legs 26' and 27' are disposed directly opposite each other instead of laterally offset as in the form of the invention of Figures 14, 15 and 16. In other respects, the fastener of Figures 14A and 15A is the same as that of Figures 14 and 15 and it functions in the same way in securing a trim panel, for example, to a supporting structure in the manner already described with reference to Figure 17.

In the form of the invention illustrated in Figures 18 and 19, a further modified form of fastener is disclosed including a shank consisting of the legs 26, 27 connected together at the end of the shank by a loop 25 disposed in a plane normal to the plane of said legs as in the fasteners previously described. In this form of the invention, the head of the fastener comprises two open loops 46 and 47 which are laterally offset so as to permit the head sections to be telescoped one within the other when the legs 26 and 27 are moved towards each other, the head sections assuming the dotted line position illustrated in Figure 18. In this form of the invention the legs 26 preferably are not crossed adjacent the head so that it is only necessary to press against the sides of the legs in order to contract the head of the fastener.

The fastener of this form of the invention may be used in securing a trim panel comprising a foundation 48 to which a fabric or upholstery cover 49 is applied, the contractability of the head permitting the fastener to be applied from the uncovered side of the foundation 48 through an opening which is substantially smaller than the normal width of the head of the fastener. The opening 50 may be circular in outline, or assume any other desired form. In entering the fastener through said opening 50, the head is contracted until the head sections assume a position approximating that illustrated in dotted lines in Figure 18. The fastener may then be passed through the opening 50 and when the pressure against the legs is released the head sections will very substantially lap the foundation 48 between the cover and the foundation. This arrangement will permit the assembly of the fastener from the uncovered side of the foundation without necessitating an irregular opening in the foundation or an opening of unusual size.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wire spring stud fastener, comprising a head consisting of two arms laterally offset from each other to permit a scissors-like action and loops carried by said arms respectively, and a shank consisting of two outwardly bowed legs connected together at the end of the shank remote from said head by a third loop disposed in a plane normal to the plane of said legs.

2. A wire spring stud fastener, comprising a head consisting of two arms laterally offset from each other to permit a scissors-like action and loops carried by said arms respectively, and a shank consisting of two outwardly bowed legs connected together at the end of the shank remote from said head by a third loop, the plane of said last named loop being at right angles to the plane of each of said legs and at substantially right angles to said first named loops.

3. A wire spring stud fastener consisting of a head composed of two semi-circular loops arranged to together form a circular outline, and a pair of arms arranged in side by side relation diametrically of said circular outline, a leg depending from each of said arms, each leg being bowed outwardly with respect to the other leg, and a loop connecting said legs together at their ends remote from said head, said last named loop being arranged in a plane normal to the plane of each of said legs.

4. A spring stud fastener having a wire head including the ends of a piece of wire, a sheet metal cap secured to said head so as to prevent movement of said ends, and a shank depending from said head and comprising a diamond-shaped portion and a loop portion, said loop portion being disposed in a plane normal to the plane of said diamond-shaped portion.

5. A spring stud fastener having a wire head including the ends of a piece of wire, a sheet metal cap secured to said head so as to prevent movement of said ends, and a shank depending from said head and comprising a pair of outwardly bowed legs and a loop connecting them together, said loop being arranged in a plane normal to that of either of said legs.

6. A spring stud fastener, consisting of a head comprising two sections connected together by a shank consisting of two outwardly-bowed wire legs united by an integral loop disposed in a plane transverse to the plane of either of said legs, said legs being disposed in offset relation and connected to said head by portions crossed adjacent the plane of said head.

7. A spring stud fastener, comprising an expansible and contractible shank consisting of two legs having inclined holding shoulders for engagement with the inside of a sheet metal structure when said shank is forced through an opening therein, and means at the entering end of said shank to connect said legs together, said means including a wire portion disposed in a plane transverse to the planes in which said legs move whereby said portion is put under torsion when said legs are moved.

8. A spring stud fastener, comprising a head of circular disk-like form and a shank consisting of two legs provided with edge surfaces that diverge from the head and then converge toward the entering end of the shank, said legs being connected together at said end by a pair of united arms disposed in a plane transverse to the planes of movement of said legs whereby said arms are put under torsion when said legs are moved in entering said shank into an opening smaller than the maximum width of said shank measured across said legs.

9. A one-piece wire spring stud fastener, comprising a head and a shank and including three loops, two of said loops being disposed in substantially the same plane to form the head of the fastener, and the third loop being disposed in a plane normal to said first named plane and passing substantially midway between said two loops and forming the end of the shank, and said shank also including a pair of outwardly bowed legs disposed in planes normal to both of said named planes, each leg connecting one side of said third loop to one of the loops of said head.

BION C. PLACE.